(12) United States Patent
Mellaerts

(10) Patent No.: US 12,518,195 B2
(45) Date of Patent: Jan. 6, 2026

(54) METHOD FOR ANOMALY DETECTION WITHIN A DATASET, SPECIFICALLY DESIGNED FOR BEING IMPLEMENTED ON A QUANTUM ANNEALING DEVICE

(71) Applicant: BULL SAS, Les Clayes sous Bois (FR)

(72) Inventor: Julien Mellaerts, Les Clayes sous Bois (FR)

(73) Assignee: BULL SAS, Les Clayes sous Bois (FR)

(*) Notice: Subject to any disclaimer, the term of this patent is extended or adjusted under 35 U.S.C. 154(b) by 0 days.

(21) Appl. No.: 18/781,189

(22) Filed: Jul. 23, 2024

(65) Prior Publication Data
US 2025/0111261 A1 Apr. 3, 2025

(30) Foreign Application Priority Data
Jul. 24, 2023 (EP) .................................. 23306269

(51) Int. Cl.
*G06N 10/70* (2022.01)
*G06N 10/40* (2022.01)
*G06N 10/60* (2022.01)

(52) U.S. Cl.
CPC ............. *G06N 10/70* (2022.01); *G06N 10/40* (2022.01); *G06N 10/60* (2022.01)

(58) Field of Classification Search
None
See application file for complete search history.

(56) References Cited

U.S. PATENT DOCUMENTS 11,501,195 B2 * 11/2022 Rose .................. G06N 20/00
2021/0303915 A1 * 9/2021 Mandal ............... G06F 18/2321
(Continued)

OTHER PUBLICATIONS

European Search Report for corresponding EP Application No. 23306269.4, dated Jan. 5, 2024.

*Primary Examiner* — Mujtaba M Chaudry
(74) *Attorney, Agent, or Firm* — Meagher Emanuel Laks Goldberg & Liao, LLP

(57) ABSTRACT

A method for anomaly detection within a dataset X of N data points is implemented on a quantum annealing device including a plurality M of qubits, with M≥N. A cost function to be minimized is defined as:

$$q(x, \alpha) = -\alpha \sum_{i=0}^{N-1} d_i x_i \pm (1 - \alpha) \sum_{i,j=0, i \neq j}^{N-1} d_{i,j} x_i x_j$$

where $d_i$ is a distance between a point $x_i \in X$ and a centroid of the dataset distribution, $d_{i,j}$ is a distance between two data points $x_i, x_j \in X$ with $i \neq j$, $\alpha \in \mathbb{R}$ is a weighting parameter, and $x_i, x_j = \{0, 1\}$. If a qubit can interact with a maximum determined number of different qubits, applying the cost function $q(x, \alpha)$ to the plurality of qubits comprises limiting a number of quadratic terms for each variable $x_i$ to a value k smaller than or equal to the maximum determined number of interactions between qubits within the quantum annealing device. An assignment of binary values to the variables in the dataset that minimizes the cost function is calculated, and the k variables in the dataset associated with qubits of value 1 are detected as anomalies.

5 Claims, 2 Drawing Sheets

(56) References Cited

U.S. PATENT DOCUMENTS

| | | | |
|---|---|---|---|
| 2022/0292675 A1* | 9/2022 | Ramesh | G06N 10/60 |
| 2022/0383174 A1* | 12/2022 | Saeed | G06N 5/01 |
| 2023/0094389 A1* | 3/2023 | You | G06N 5/01 |
| | | | 706/62 |

* cited by examiner

[Fig. 1]
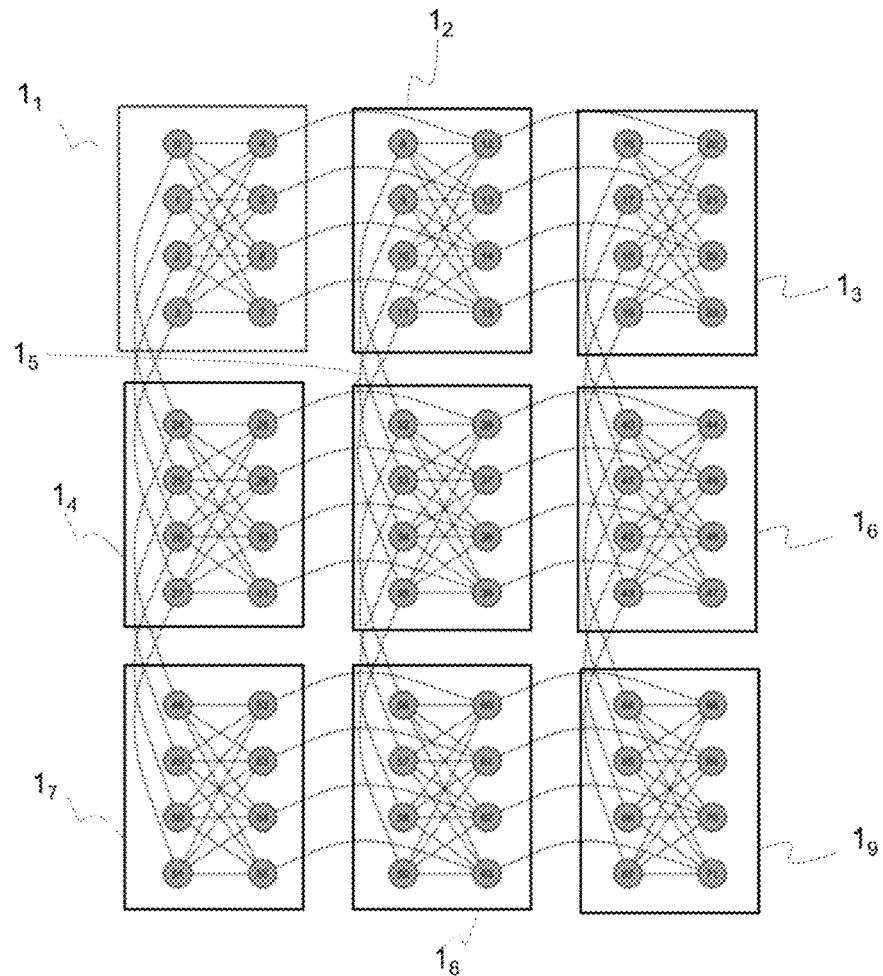
[Fig. 2]
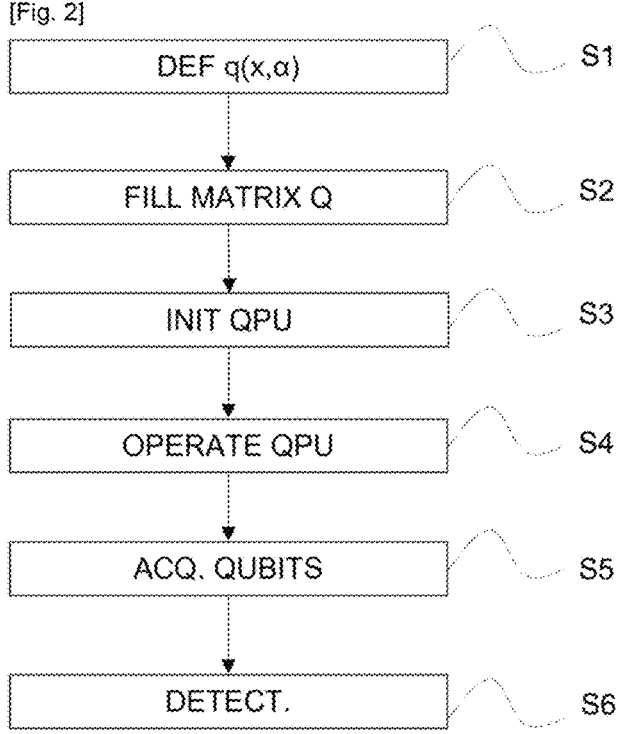

[Fig. 3]
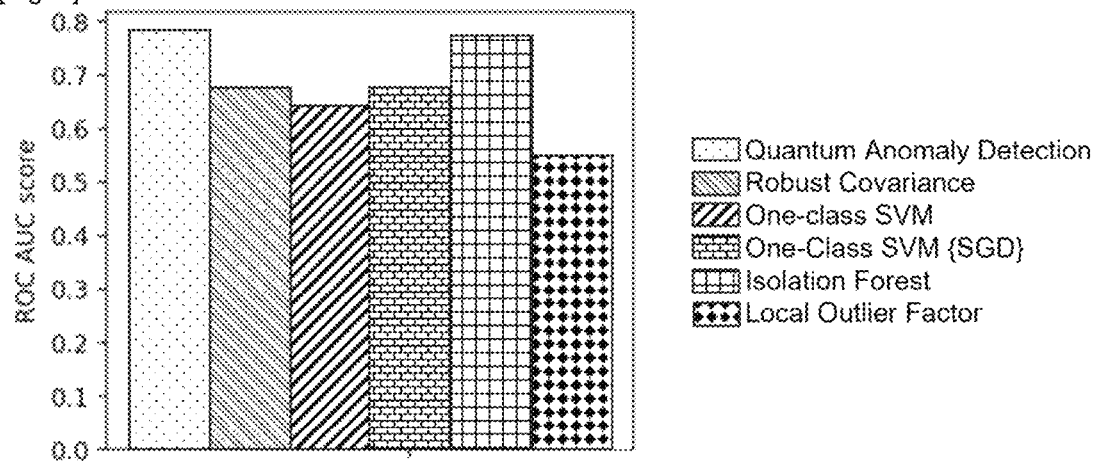
[Fig. 4]

METHOD FOR ANOMALY DETECTION WITHIN A DATASET, SPECIFICALLY DESIGNED FOR BEING IMPLEMENTED ON A QUANTUM ANNEALING DEVICE

Anomaly detection is a crucial task in machine learning that involves identifying unusual patterns or events in data. It has numerous applications in various domains such as finance, healthcare, and cybersecurity. With the advent of quantum computing, there has been a growing interest in developing quantum approaches to anomaly detection.

Actually, quantum computing has been developing recently as it gives promising hopes to solve problems that are classically intractable.

TECHNICAL BACKGROUND

Anomaly detection refers to the identification of patterns or instances that deviate significantly from the expected or normal behavior within a data set. These anomalies often indicate potential fraud, errors, faults, or other exceptional events that require attention. By leveraging advanced algorithms and statistical techniques, anomaly detection algorithms are widely used in many applications like finance, healthcare and cybersecurity.

Quantum computing and machine learning are two rapidly advancing fields that have the potential to revolutionize various domains. Quantum machine learning (QML) combines the power of quantum computing with the principles of machine learning, opening up new possibilities for solving complex problems and enhancing the capabilities of traditional machine learning algorithms. At its core, quantum computing harnesses the principles of quantum mechanics to manipulate and process information in ways that classical computers cannot. Quantum bits, or qubits, can exist in a superposition of states, allowing for parallel computation and the potential to perform complex calculations exponentially faster than classical computers for certain problems. This unique property of quantum computing forms the basis for developing quantum machine learning algorithms.

Quantum machine learning aims to leverage quantum computers to enhance the speed and efficiency of various machine learning tasks. It offers the promise of solving computationally intensive problems that are intractable for classical machine learning algorithms, and relies on phase estimation, quantum matrix inversion and amplitude amplification methods. Several key areas within quantum machine learning have already shown promising advancements, notably in data classification, graphs applications or pattern recognition.

We can classify quantum computers into a "quantum gate" model (or quantum circuit) and a "quantum annealer". They have different use cases and architectures.

The quantum gate model computers are designed for universal purposes by applying gates to build complex algorithms. They can be considered the upward compatible machines of classical computers. However, the gate model requires high-quality qubit processors, and the number of qubits so far is limited.

The limitations of real quantum gate computers are twofold.

First, a qubit can only retain its state for a very short time. It may decay to another state or interact with the environment and lose the original quantum state. The coherence time of state-of-the-art qubits is of the order of 100 μs. All the computation must be accomplished within a fraction of the qubit coherence time, which sets an upper bound to the number of sequential quantum gates that can be applied on qubits.

Second, each quantum operation can introduce errors.

Therefore, quantum gate computers are not adapted so far to perform calculations on big datasets, and their technology is not scalable.

On the other hand, quantum annealers rely on use of the minimum energy principle, which, in physics, states that the internal energy decreases and approaches the minimum values. A quantum annealer could be able to search for the best possible answer to a problem which would be formulated in the form of an energy minimization equation. There exists quantum annealing devices with up to 7000 qubits, which allow working on big datasets.

Quantum annealing indeed seeks to utilize effects known as quantum fluctuations, to find the best possible solution for the problem that the user is trying to solve. Rather than expressing the problem in terms of quantum gates, the problem can be expressed as an optimization problem, and the quantum annealing computer seeks to find the best solution.

Quantum annealer is relatively noise-tolerant compared to the gate model. However, its drawback is that not all qubits are connected.

Current quantum anomaly detection (QAD) algorithms are implemented on gate-based quantum computing paradigm making use of amplitude estimation, variational or quantum K-means technics. Actual Noisy Intermediate-Scale Quantum (NISQ) computers are composed of number-limited noisy qubits, impacting the practicability of these gate-based QAD algorithms in terms of data set size or dimensionality.

There is a need for a quantum anomaly detection algorithm that would be specifically adapted to a technical implementation on a quantum computer of the quantum annealer type, and that would be designed to exploit the specificities of the internal functioning of a quantum annealer to achieve efficient and accurate results in anomaly detection.

SUMMARY

The present disclosure fulfils this need and proposes a method for anomaly detection within a dataset $X=(x_0, \ldots, x_{N-1})$ of N data points, said method being implemented on a quantum annealing device comprising a quantum calculation unit including a plurality M of quantum bits, also known as qubits, with $M \geq N$, wherein a qubit of said quantum calculation unit can interact with a maximum determined number of different qubits of said quantum calculation unit, said method comprising a. defining a cost function to be minimized by said quantum annealing device as:

$$q(x, \alpha) = -\alpha \sum_{i=0}^{N-1} d_i x_i - (1-\alpha) \sum_{i,j=0, i \neq j}^{N-1} d_{i,j} x_i x_j$$

where $d_i$ is a distance between a point $x_i \in X$ and a centroid of said dataset distribution, $d_{i,j}$ is a distance between two data points $x_i$, $x_j \in X$ with $i \neq j$, $\alpha \in \mathbb{R}$ is a weighting parameter, with $0 \leq \alpha \leq 1$ and $x_i$, $x_j = \{0,1\}$;

b. applying said cost function $q(x, \alpha)$ to said plurality of qubits by associating a qubit of said plurality of qubits to a variable $x_i$ in said dataset X, wherein applying said cost function comprises limiting a number of quadratic terms for each variable $x_i$ in said cost function $q(x, \alpha)$ to a value k which is smaller than or equal to said maximum determined number of interactions between qubits within said quantum annealing device, by setting $$\sum_{i=0}^{N-1} x_i = k;$$

c. calculating, by said quantum calculation unit, an assignment of binary values to said variables $x_i$ in said dataset X that minimizes an absolute value of said cost function;

d. acquiring a value 0 or 1 associated to each qubit of said plurality of qubits depending on a state of said qubit upon completion of said calculating;

e. detecting k variables $x_i$ in said dataset X associated with qubits of acquired value 1 as anomalies within said dataset $X=(x_0, \ldots, x_{N-1})$.

Such a method for anomaly detection is implemented on a quantum annealing device and is specifically adapted to this technical implementation to take account of the maximum number of possible interactions within qubits within the quantum annealing device, as will be explained in more details in the description of embodiments in relation with the drawings.

According to another aspect, the method comprises adding a penalty $$A\left(\sum_{i=0}^{N-1} x_i - k\right)^2$$

to the cost function $q(x, \alpha)$, where $A \in \mathbb{R}$ is a penalty weight.

According to another aspect, a value of A is at least one order of magnitude greater than the greatest distance value in the cost function applied to the plurality of qubits.

According to a further aspect, the distance is a Mahalanobis distance.

According to another aspect, the present disclosure proposes a non-transitory computer readable storage medium, having stored thereon a computer program comprising program instructions, the computer program being loadable into a data-processing unit of a quantum annealing device and adapted to cause the data-processing unit to carry out a method for anomaly detection as described in the present disclosure.

BRIEF DESCRIPTION OF DRAWINGS

Other features, details and advantages will be shown in the following detailed description and on the figures, on which:

FIG. 1 is a view of an example of a quantum calculation unit in a quantum annealing device.

FIG. 2 is a view of a flowchart of a method according to an embodiment.

FIG. 3 is a view of an example of a matrix Q, representing a QUBO problem, as filled according to the method of FIG. 2.

FIG. 4 shows comparative results of the method of FIG. 2 with classical anomaly detection algorithms in the form of a histogram.

DESCRIPTION OF EMBODIMENTS

The general principle of the present disclosure relies on a Quadratic Unconstrained Binary Optimization (QUBO) formulation of a quantum anomaly detection (QAD) algorithm, which is specifically defined and adapted to be solved on a quantum annealer including a plurality of quantum bits (qubits) with a limited number of possible interactions between qubits.

Anomaly detection algorithms which run on computing devices based on classical information processing, i.e., computing devices not making use of quantum mechanical effects, are largely implemented in the classical machine learning field, to detect anomalies, also called outliers, in a data set, which may correspond to data gathered in any technological field, including healthcare, finance, cybersecurity, etc.

The purpose of such algorithms is to identify the data points within a data set which are the furthest to a normal value or a mean value associated to the data set and detect them as potential anomalies. The data set is typically divided into a train set and a test set. The train set is used to train a model of anomaly detection, which is then validated by using the test set. It generally relies on the assumption of a Gaussian distribution of the data points within the data set.

Several types of anomaly detection algorithms exist.

A first type relies on detecting the data points which are the furthest from a centroid of the Gaussian distributed data set.

A second type of algorithms are density-based algorithms, that can be seen as finding neighbors most distant data points.

Both types of algorithms rely on use of a distance metric, which can be a Euclidean distance, a Mahalanobis distance, etc. depending on the type of data and on the data set.

Classical computing devices are computationally limited and cannot handle such anomaly detection algorithms if the data set is too big.

The present disclosure proposes a new formulation to an anomaly detection algorithm, which relies on Quadratic Unconstrained Binary Optimization (QUBO). QUBO is a mathematical optimization problem that involves minimizing a quadratic objective function subject to binary variables. In other words, it is an optimization problem where the goal is to find the binary values of a set of variables that minimize a quadratic cost function.

The binary variables in QUBO can take only two values: 0 and 1, representing a binary choice or decision. The objective function in QUBO is quadratic, meaning it consists of quadratic terms involving the binary variables and possibly linear terms as well. The goal is to find the assignment of binary values to the variables that minimizes the overall value of the objective function.

A QUBO problem is represented by a matrix $Q \in \mathbb{R}^{n*n}$ where n>0 is the number of binary variables. The set of binary vectors of a fixed length n>0 is denoted by $B^n$, where $B=\{0,1\}$ is the set of binary values, or bits. The entries $Q_{i,j}$ define a weight for each pair of indices i, $j \in \{1, \ldots, n\}$ within the binary vector. We can define a function $q: B^n \rightarrow \mathbb{R}$ that assigns a value to each binary vector through:

$$q(x) = x^T Q x = \sum_{i=1}^{n} \sum_{j=1}^{n} Q_{i,j} x_i x_j$$

The weight $Q_{i,j}$ is added if both $x_i$ and $x_j$ have value 1. When i=j, the values $Q_{i,i}$ are added if $x_i=1$, as $x_i x_i = x_i$ for all $x_i \in B$.

The QUBO problem consists of finding a binary vector x* that is minimal with respect to q, namely $$x^* = \arg\min_{x \in B^n} q(x).$$

The complexity of QUBO arises from the number of candidate binary vectors to be evaluated, as $|B^n|=2^n$ grows exponentially in n.

However, due to its close connection to Ising models, QUBO constitutes a central problem class for adiabatic quantum computation and is an interesting candidate for being solved through a physical process called quantum annealing.

Yet, not all QUBO formulations are compliant with direct execution on a quantum computer due to limited connectivity of quantum processing units, QPUs.

To date, two different QPUs are available on the market, as commercialized by the D-wave® company: Chimera® topology for D-Wave® 2000Q systems and Pegasus® topology for Advantage® systems. Description of embodiments will be further made in the context of these two different QPUs. However, the disclosure is not limited to the use of such QPUs and the proposed anomaly detection method may be implemented on any other quantum annealing device.

FIG. 1 illustrates the Chimera® architecture, in the form of a 3×3 Chimera® graph, denoted C3, which is made of nine connected unit cells, referenced $1_i$ to $1_9$, each with four horizontal qubits connected to four vertical qubits via couplers. There are thus 72 qubits which are labeled 0 to 71. Unit cell referenced $1_i$ comprises two sets of four qubits, a first set of four qubits which are labeled 0 to 3 and a second set of four qubits which are labeled 4 to 7. Each qubit connects to all qubits in the other set but to none in its own; for example, the qubit labeled 0 connects to qubits labeled 4 to 7. This corresponds to internal couplers. Moreover, external couplers connect colinear pairs of qubits (i.e. pairs of parallel qubits in the same row or column). For example, qubit labeled 4 in unit cell $1_1$ connects to qubit labeled 12 in unit cell $1_2$ on the same row, and qubit labeled 0 in unit cell $1_1$ connects to qubit labeled 24 in unit cell 14 in the same column. Hence, unit cells $1_1$ to $1_9$ are tied vertically and horizontally with adjacent qubits connected, creating a lattice of sparsely connected qubits.

As may be observed, each Chimera® qubit is thus coupled to a maximum number of six different qubits. The D-Wave® 2000Q QPU supports a C16 Chimera® graph, consisting of an 16×16 grid of unit cells: its 2048 qubits are logically mapped into a 16×16 matrix of unit cells of eight qubits.

The Pegasus® architecture is slightly different from Chimera® architecture in the sense that qubits are more densely connected and have three types of couplers (internal, external and odd). In Advantage® QPUs, qubits are "oriented" vertically or horizontally, as in the Chimera® topology, but similarly aligned qubits are also shifted. Internal couplers connect pairs of orthogonal (with opposite orientation) qubits. Each qubit is connected via internal coupling to twelve other qubits. External couplers connect vertical qubits to adjacent vertical qubits and horizontal qubits to adjacent horizontal qubits. Odd couplers connect similarly aligned pairs of qubits.

Finally, Pegasus qubits are considered to have a nominal length of 12 (each qubit is connected to 12 orthogonal qubits through internal couplers) and degree of 15 (each qubit is coupled to 15 different qubits). Each Pegasus qubit is thus coupled to a maximum number of fifteen different qubits.

In other words, all known quantum annealing devices are made of QPUs comprising a plurality of qubits with a maximum determined number of possible interactions between qubits.

As a variable in a QUBO formulation corresponds to a qubit on the QPU, the number of quadratic terms for a given variable is directly linked to the number of coupling qubits for this variable qubit. Meaning that, if some QUBO variables have more quadratic terms than the number of physical coupling qubits (15 for Pegasus QPU), the overall QUBO problem is not directly compliant with QPU topology.

The Quantum Anomaly Detection algorithm of the present disclosure is specifically designed so that it can be run on a QPU taking account of the technical considerations of the above-described internal functioning of a quantum annealing device.

We consider a data set $X=(x_0, \ldots, x_{N-1})$ of N data points. It is assumed that this data set has a Gaussian distribution. Let's define $d_i$ the distance between a point $x_i \in X$ and the centroid of the data set distribution, and $d_{i,j}$ the distance between two data points $x_i, x_j \in X$ with $i \neq j$. The centroid of the set of points, also known as geometric center, is the arithmetic mean point position, which may be computed as the sum of all points coordinates divided by the number of points.

In an embodiment, the chosen distance metric is the Mahalanobis distance, which is an effective multivariate distance metric available in many machine learning models. However, in other embodiments, the distance metric may be a Euclidean distance for example. More generally, the distance metric may depend on the data set $X=(x_0, \ldots, x_{N-1})$.

The Mahalanobis distance is a measure of the distance between a point P and a distribution D which is a multi-dimensional generalization of the idea of measuring how many standard deviations away P is from the mean of D. This distance is zero for P at the mean of D and grows as P moves away from the mean along each principal component axis. It is thus an interesting metric, as it takes into account the correlations of the data set.

We define the cost function to minimize as:

$$q(x, \alpha) = -\alpha \sum_{i=0}^{N-1} d_i x_i - (1-\alpha) \sum_{i,j=0, i \neq j}^{N-1} d_{i,j} x_i x_j,$$

subject to:

$$x_i, x_j = \{0, 1\}$$

$$\sum_{i=0}^{N-1} x_i = k$$

where:
$0 \leq \alpha \leq 1$, is a weighting parameter for linear and quadratic terms and $0 < k \leq N$ is the number of outliers in the data set. An outlier is defined as an observation that lies an abnormal distance from other data points in a random sample from a data set.

A parallel can hence be drawn between the above QUBO formulation and anomaly detection algorithms, in the sense that, statistical-based algorithms can be seen as finding most distant data points from the centroid of a Gaussian distributed data set, which is relative to linear terms of the QUBO, and density-based algorithms can be seen as finding neighbours most distant data points, which is relative to quadratic terms of the QUBO. This drawing allows the combination of both statistical and density-based algorithms, through the above QUBO formulation.

Minimizing cost function $q(x, \alpha)$ can be seen as maximizing the distance of the points to the centroid of the dataset and density.

Linear terms of the QUBO are placed on the diagonal of matrix Q and correspond to the distance of data points to the centroid of the data set distribution, while other elements of matrix Q, out of the diagonal, are the quadratic terms corresponding to the distance between a data point and its neighbours.

According to the present disclosure, a restriction is applied to the number of quadratic terms of matrix Q, in order to make the disclosed method for anomaly detection compliant with, and adapted to QPU topology, as illustrated for example in FIG. 1. Indeed, only k-nearest neighbors data point distance is filled in the QUBO matrix, making the QUBO problem solvable by a quantum annealing device with limited coupling qubits per qubit. Such a limitation imposed on the number of quadratic terms in matrix Q allows achieving good accuracy in anomaly detection.

The quantum processing unit (QPU) can represent binary variables $x_i$ as the states of the qubits and linear and quadratic coefficients as, respectively, the physical biases and couplings applied to these qubits.

FIG. 2 illustrates a flowchart of a method for anomaly detection implemented on a quantum annealing device according to an embodiment. Such a quantum annealing device comprises a quantum calculation unit comprising a plurality of unit cells, each comprising a plurality of qubits, as illustrated for example in FIG. 1.

In a first step referenced S1, the cost function $q(x, \alpha) = -\alpha \Sigma_{i=0}^{N-1} d_i x_i - (1-\alpha) \Sigma_{i,j=0, i \neq j}^{N-1} d_{i,j}$ is defined, as described above, where $d_i$ is a Mahalanobis distance between a point $x_i \in X$ and the centroid of the dataset distribution, $d_{i,j}$ is the Mahalanobis distance between two data points $x_i, x_j \in X$ with $i \neq j$, $\alpha \in \mathbb{R}$ is a weighting parameter, with $0 \leq \alpha \leq 1$ and $x_i, x_j = \{0,1\}$.

The cost function can be seen as a sum of linear costs (corresponding to the costs associated to the distance of a data point to the centroid of the data set distribution) on the one hand, and of quadratic costs (corresponding to the density of neighbors surrounding a data point) on the other hand.

The weighting parameter $\alpha \in \mathbb{R}$ may be initialized with a value $\alpha=0.5$ to apply a same weight to both the linear costs, associated to the distance to the centroid, and the quadratic costs, associated to the density of neighbours. The optimum value of $\alpha \in \mathbb{R}$ is adjusted by successive trials, depending on the data set X, to increase the weight of either the distance to the centroid, or the density of neighbours.

In an embodiment, step S1 comprises adding a penalty $A(\Sigma_{i=0}^{N-1} x_i - k)^2$ to the cost function $q(x, \alpha)$, where $A \in \mathbb{R}$ is a penalty weight, such that:

$$q(x, \alpha) = -\alpha \sum_{i=0}^{N-1} d_i x_i - (1-\alpha) \sum_{i,j=0,i \neq j}^{N-1} d_{i,j} x_i x_j + A \left( \sum_{i=0}^{N-1} x_i - k \right)^2$$

The number of outliers to select in the data set can be constrained in the QUBO thanks to this penalty. Such a penalty model allows imposing higher values of the cost function for values of variables that violate the constraint. By adding such a penalty model to the cost function $q(x, \alpha)$, we make it less likely that solutions that violate the constraint are selected by a QPU that seek low-energy states.

The value of A may be arbitrarily selected but the A parameter must be, at least, one order of magnitude greater than the greatest distance value in matrix Q.

However, given a data set X with a known proportion of 10% of anomalies, it is advantageous to force the algorithm to select 10% of variables in the data set X at final step referenced S6. To this purpose, A may be chosen as being ten times bigger than the maximum distance $d_{i,j}$ for the data set, or as being ten times bigger than an order of magnitude of the distances within the data set. We thus make sure that the weight of the penalty is greater than the weight of the distances in the cost function.

In a second step referenced S2, the matrix Q is filled with values derived from the cost function $q(x, \alpha)$. However, when filling matrix Q, a number of quadratic terms for each variable $x_i$ in the cost function $q(x, \alpha)$ is limited to a value k which is smaller than or at most equal to the maximum number of interactions between qubits within the quantum annealing device. In other words, the matrix Q is filled with diagonal terms corresponding to the linear terms of the cost functions, and with some non-diagonal terms, in a limited number k which depends on the maximum determined number of interactions between qubits in the quantum computing unit. Such a partially empty matrix Q is illustrated in FIG. 3.

For example, let's consider a data set X comprising a hundred data points, among which 10% are anomalies. The value of k can be set to k=10, which means that for any data point $x_i$, 10 quadratic terms are filled in matrix Q, which correspond to the 10 data points which are the closest neighbours to data point $x_i$.

In the example of FIG. 3, matrix Q comprises only six quadratic terms, which makes the formulation of the QUBO problem compliant with solving by a Chimera® QPU, in which each qubit can be coupled to a maximum number of six qubits. Matrix Q of FIG. 3 corresponds to the following formulation of the cost function:

$$q(x, \alpha) = -9x_1 - 8x_2 - 7x_3 - 6x_4 - 5x_5 + 22x_1 x_2 + 24x_2 x_3 + 26x_4 x_5$$

Steps S1 and S2 require classical computing only, and aim at creating matrix Q, which may be seen as a 2D-table of values. In the following steps, matrix Q is sent to a quantum computing device for treatment.

To this purpose, in a third step INIT QPU referenced S3, the qubits of the unit cells are placed in an initial state. Initially, the qubits are in their fundamental |0>state, non-superimposed, non intricate.

In a fourth step referenced S4, the QPU is operated to seek the variables which minimize the cost function. In other words, matrix Q as filled at step S2 is applied to the M qubits of the quantum computing unit. Each qubit is associated to a variable in the dataset X and is placed in superposition state with a given probability of 0 and 1 depending on the linear term of the matrix Q. In an embodiment, a qubit's state is implemented as a circulating current, with a corresponding external magnetic field: the strength of this magnetic field modifies the 0 or 1 probability in accordance with the linear term. The programmable quantity that controls the external magnetic field is called a bias, and the qubit minimizes its energy in the presence of the bias.

Then, qubits are intricated depending on bias between variables using couplers. A coupler can make two qubits tend to end up in the same state—both 0 or both 1—or it can make them tend to be in opposite states. Like a qubit bias, the correlation weights between coupled qubits can be programmed by setting a coupling strength. Couplers use a phenomenon of quantum physics called entanglement. When two qubits are entangled, they can be thought of as a single object with four possible states: (0,0), (0,1), (1,1), and (1,0). The relative energy of each state depends on the biases of qubits and the coupling between them.

Values for the biases and couplers are directly derived from the values in matrix Q. The biases and couplings derived from matrix Q define an energy landscape, and the quantum annealing device finds the minimum energy of that landscape.

In summary, the system starts at step S3 with a set of qubits, each in a superposition state of 0 and 1. They are not yet coupled. When they undergo quantum annealing at step S4, the couplers and biases derived from matrix Q (with a limited number of quadratic terms) are introduced and the qubits become entangled. At this point, the system is in an entangled state of many possible answers. By the end of the anneal at step S5, each qubit is in a classical state that represents the minimum energy state of the problem: in other words, at step S4, the quantum calculation unit computes an assignment of binary values to the variables $x_i$ in the dataset X that minimizes an absolute value of the cost function.

At step S5, the final states of the qubits are measured and an associated value 0 or 1 is acquired for each qubit, depending on its measured final state. It is actually recalled that a qubit has two basic states, denoted as $|0\rangle$ and $|1\rangle$. The state of a qubit can be described as a linear combination of the two basic states, represented by $|\psi\rangle = \alpha|0\rangle + \beta|1\rangle$, where $\alpha, \beta \in \mathbb{C}$ and $|\alpha|^2 + |\beta|^2 = 1$. However, at the end of the measurement, each qubit is in one of its two basic or classical states.

The output of step S5 is thus a set of N binary values corresponding to the final states $|0\rangle$ or $|1\rangle$ of N qubits in the quantum annealing device. By construction of the cost function, a value 1 indicates that the corresponding variable is an outlier.

In a step referenced S6, post-processing is applied to the set of binary values output by the quantum annealing device at step S5, and outliers are thus identified in the data set X, as the variables associated with a qubit with value 1.

This quantum anomaly detection has been run on several real-world use-cases, among which the cardiotocography dataset. The cardiotocography dataset consists of measurements of fetal heart rate (FHR) and uterine contraction (UC) features on cardiotocograms classified by expert obstetricians (Campos,D. and Bernardes,J. (2010). Cardiotocography. UCI Machine Learning Repository. https://doi.org/10.24432/C51S4N).

In this classification dataset, the classes are normal, suspect, and pathologic. For outlier (anomaly) detection, the normal class formed the inliers, while the pathologic (outlier) class is downsampled to 176 points. The suspect class is discarded.

The method for anomaly detection according to the present disclosure was performed on the cardiotocography dataset, and its results were compared with five other classical anomaly detection algorithms from the "Scikit learn" library:
Robust covariance 'covariance.EllipticEnvelope';
One-Class SVM 'svm.OneClassSVM';
One-Class SVM SGD 'svm. SGDOneClassSVM';
Isolation Forest 'ensemble.IsolationForest';
Local Outlier Factor 'neighbors.LocalOutlierFactor'.

The results are illustrated in FIG. 4, where the metric is the Area Under the Receiver Operating Characteristic Curve (ROC AUC) score. A receiver operating characteristic (ROC), or simply ROC curve, is a graphical plot which illustrates the performance of a binary classifier system as its discrimination threshold is varied. It is created by plotting the fraction of true positives out of the positives (TPR=true positive rate) vs. the fraction of false positives out of the negatives (FPR=false positive rate), at various threshold settings. TPR is also known as sensitivity, and FPR is one minus the specificity or true negative rate. This function requires the true binary value and the target scores, which can either be probability estimates of the positive class, confidence values, or binary decisions.

As may be observed, QAD according to the present disclosure gives better accuracy than all other anomaly detection algorithms:

The invention claimed is:

1. A method for anomaly detection within a dataset $X=(x_0, \ldots, x_{N-1})$ of N data points, said method being implemented on a quantum annealing device comprising a quantum calculation unit including a plurality M of quantum bits, also known as qubits, with $M \geq N$, wherein a qubit of said quantum calculation unit can interact with a maximum determined number of different qubits of said quantum calculation unit, said method comprising:

a. defining a cost function to be minimized by said quantum annealing device as:

$$q(x, \alpha) = -\alpha \sum_{i=0}^{N-1} d_i x_i \pm (1-\alpha) \sum_{i,j=0, i \neq j}^{N-1} d_{i,j} x_i x_j$$

where $d_i$ is a distance between a point $x_i \in X$ and a centroid of said dataset distribution, $d_{i,j}$ is a distance between two data points $x_i, x_j \in X$ with $i \neq j$, $\alpha \in \mathbb{R}$ is a weighting parameter, with $0 \leq \alpha \leq 1$ and $x_i, x_j = \{0, 1\}$;

b. applying said cost function $q(x, \alpha)$ to said plurality of qubits by associating a qubit of said plurality of qubits to a variable $x_i$ in said dataset X, wherein applying said cost function comprises limiting a number of quadratic terms for each variable $x_i$ in said cost function $q(x, \alpha)$ to a value k by setting $\Sigma_{i=0}^{N-1} x_i = k$, where k is smaller than or equal to said maximum determined number of interactions between qubits within said quantum annealing device;

c. calculating, by said quantum calculation unit, an assignment of binary values to said variables $x_i$ in said dataset X that minimizes an absolute value of said cost function;

d. acquiring a value 0 or 1 associated to each qubit of said plurality of qubits depending on a state of said qubit upon completion of said calculating;

e. detecting k variables $x_i$ in said dataset X associated with qubits of acquired value 1 as anomalies within said dataset $X=(x_0, \ldots, x_{N-1})$.

2. The method of claim 1, wherein it comprises adding a penalty $A(\Sigma_{i=0}^{N-1} x_i - k)^2$ to said cost function $q(x, \alpha)$, where $A \in \mathbb{R}$ is a penalty weight.

3. The method of claim 2, wherein a value of A is at least one order of magnitude greater than the greatest distance value in said cost function applied to said plurality of qubits.

4. The method of claim 1, wherein said distance is a Mahalanobis distance.

5. A non-transitory computer readable storage medium, having stored thereon a computer program comprising program instructions, the computer program being loadable into a data-processing unit of a quantum annealing device and adapted to cause the data-processing unit to carry out a method for anomaly detection according to claim 1.

* * * * *